United States Patent Office 3,019,119
Patented Jan. 30, 1962

3,019,119
CELLULOSE ACETATE SPINNING SOLUTIONS
Henry Allen Hoffman, Jr., and Leander Adair Sherbeck, Waynesboro, Va., assignors to E. I. du Pont de Nemours and Company, Wilmington, Del., a corporation of Delaware
No Drawing. Filed Aug. 29, 1958, Ser. No. 757,934
6 Claims. (Cl. 106—169)

This invention relates to organic cellulose derivatives and articles composed thereof having modified dyeing characteristics.

Techniques of forming articles from cellulose esters and the like are well-known, especially the procedure of dissolving a cellulose derivative in an organic solvent, extruding the resulting solution through an aperture of suitable shape and size and removing the solvent to leave a solid shaped article. Of considerable commercial importance are such articles in the form of filaments and films. In particular the use of cellulose triacetate in the manufacture of such articles is of considerable interest because of the desirable thermophysical properties of the articles so produced. Such articles can be heat-set and show good glazing and wrinkle resistance and pleat and crease retention during ordinary conditions of use. These products however, leave much to be desired from the standpoint of dyeability.

Articles composed solely of cellulose triacetate are dyeable only at the boil with dispersed dyes which must be carefully selected to give adequate fastness levels for end use requirements. Because of the wash-and-wear properties possible in a heat-set triacetate, fastness requirements dictate costly dyestuffs for many shades. To obtain many deep shades, the use of carriers or pressure dyeing is required, both of which are difficult to control and add to the ultimate cost of the article. Moreover, articles which are dyed by these procedures exhibit undesirable shade changes upon exposure to light and wash conditions, and the dyestuffs in the articles sublime when heated, such as during ironing.

Recently it was found (Hoffman and Wilkinson, U.S. Patent No. 2,849,330) that the addition of minor amounts of sulfonated polymeric materials to cellulose triacetate greatly improved dyeability with basic dyes. The products had good fastness properties and were resistant to dye sublimation.

The inability to carry dyeings beyond medium shades (2–3% commercial dye) without resorting to carriers or pressure dyeing with the aforementioned attendant disadvantages and any limitations in light fastness are a consequence of the extent of penetration of a dyestuff into the body of the article. Depth of penetration of basic dyes in a reasonable time (3–4 hours at 100° C.) is only about 10–20% of the fiber radius of prior art compositions. The present invention permits greater penetration.

A primary object of the present invention is fast-coloration of articles composed of predominantly organic derivatives of cellulose. Another object is modification of compositions of cellulose triacetate to include sites for reception of basic dyes. A further object is the production of filaments and films of cellulose triacetate compositions having improved affinity for basic dyes without impairment of physical properties thereof. Other objects together with means and methods for obtaining the various objects will become apparent in the following description.

In general the objects of the present invention are accomplished by incorporating in a common organic solvent, cellulose triacetate, a minor amount of a polymeric substance containing as part of the polymer structure sulfonic acid groups available for reaction with dyestuffs and a further minor amount of an organic cellulose derivative of reduced substituent content which is capable of increasing the penetrability of the parent cellulose derivative to solutions of the basic dyestuffs and removing the solvent.

To facilitate the discussion and understanding of the invention reference should be made to the following definitions and explanations of terms. These terms whenever employed herein are to be construed in accordance with such definitions and explanations.

Filamentary structures will be used herein to exemplify the generic term "shaped articles" since in this form the invention has its greatest utility. The term "filamentary structure" refers to articles of manufacture having a length which greatly exceeds any transverse dimension such as yarns, threads, fibers and especially filaments, however, the invention also has applicability to films. "Dye penetration" denotes the extent to which a dyestuff has penetrated an individual filament along the filament radius and is determined by direct comparison (versus a specified control) of cross-section photomicrographs. A "moderate increase" in dye penetration is a 25–50% increase along the filament radius, greater than 50% is termed "nearly complete," and "complete" signifies dye penetration to the center of the filament. Where the dye penetration is only 10–20% of the filament radius the filament is said to be "ring-dyed."

In accordance with the present invention the material present in major amount in the composition is cellulose triacetate, acetylated cellulose containing 2.7 to 3.0 acetyl groups per glucose unit. Such substances are characterized by being hydrophobic and resistant to aqueous solutions of dyestuffs as measured by a lack of penetration of such dyestuffs into the shaped articles composed thereof. The cellulose triacetate occurs in the compositions of the invention to an extent not less than 60% of the final article weight and preferably contains about 2.9 acetyl groups per glucose unit.

One of the components present in minor amounts in the composition is a polymeric substance also soluble in the solvent from which the triacetate is to be spun and containing as part of the polymer structure, sulfonic acid groups available for reaction with basic dyestuffs. The polymeric material bearing the sulfonic groups may be cellulosic or non-cellulosic formed by either addition or condensation. Preferably this minor component is an ester or an ether of cellulose containing the attached sulfonic acid groups.

The sulfonic acid group may be either a dangling —SO$_3$H group, wherein the valence bond indicates attachment to the polymer structure or a hydrolyzable salt thereof in which hydrogen is replaced by a convenient neutralizing cation such as alkali metal, alkaline earth metal, ammonium or organo-substituted ammonium ion. The sulfonic groups may be present in a monomeric predecessor of the modifying polymer or may be added or substituted onto the polymer itself.

Preferably the sulfonic acid-modified component is a sulfonated cellulose ether or ester. The sulfonic acid group will then be attached to the polymer chain through ether linkages such as alkoxy, aryloxy and aralkoxy groups or through ester linkages such as

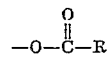

where R is alkyl, aryl or aralkyl. The alkyl and alkoxy groups are preferably lower alkyl and alkoxy i.e., up to six carbon atoms and the aryl groups are preferably phenyl. As examples of such ether groupings which are attached to the cellulosic chain are sulfoethoxy, sulfopropoxy, sulfobenzoxy, sulfobenzylethoxy, etc. Among suitable ester groupings are sulfopropionate, sulfobenzoate, sulfosuccinate, sulfophthalate, etc.

As examples of suitable acid-modified cellulose compositions coming within the scope of the present invention, there may be mentioned in addition to those disclosed previously, sulfopropyl cellulose acetate and its sodium salt, sulfobenzyl cellulose acetate and its ammonium salt, the triethyl ammonium salt of cellulose acetate sulfobenzoate, cellulose acetate sulfosuccinate, cellulose acetate sulfophthalate, solfonated cellulose acetate crotonate, etc.

The unsulfonated minor component is a cellulose acetate containing from 2.0–2.3 acetyl groups per glucose unit with about 2.2 groups being preferred. Ordinarily, the lower the degree of acetyl substitution of the unsulfonated minor component, the less this material need occur in the final article.

The minor components are present at levels of from 5–25% respectively in the final article depending on their solubility behavior and the degree of dyeability required.

The amount of the sulfonated minor component to be used depends on the degree of the sulfonic substitution of the minor component and on the nature and solubility of it. For non-cellulosic modifiers the available sulfonic acid groups need not exceed 10–12% of the final article weight, with several percent often being adequate. In cellulosic modifiers, as much as one sulfonic group per glucose unit may be present when the solubility of the modifier is sufficient, however, as little as 0.05 sulfonic group per glucose unit has been used with about 0.22 sulfonic group per glucose unit being preferred. In general, cellulosic modifiers are preferred over non-cellulosic modifiers because of solubility considerations and compatability with the major component.

A convenient measure of sulfonate modification is the quantity "milliequivalents of sulfonic acid group per kilogram of final article." Such a milliequivalent has the value 0.032 gram of sulfur, which can be determined by the well-known Parr bomb analysis. This measure also gives an index or an estimation of dyeability, 10 milliequivalents per kilogram being the lower limit for dyeability with up to 100 milliequivalents per kilogram being sufficient. Up to 200 milliequivalents of sulfonic acid groups per kilogram of final article can be used, however, no advantage is seen or obtained by using this excessive amount.

Generally and preferably the molecular weight of both additives should be comparable to that of the major component, the cellulose triester. However, a range of molecular weights from thousands to hundreds of thousands has proven useful in this invention. The most useful range is usually indicated by solubility in the organic solvent.

In the following examples, parts and percentages are given by weight unless otherwise specified.

*Example I*

Seventy-one grams of cellulose triacetate containing 2.92 acetyl groups per glucose unit, 20 grams of secondary cellulose acetate containing 2.16 acetyl groups per glucose unit, and 9 grams of sulfoethyl cellulose acetate (SECA) containing 0.22 sulfonic acid group per glucose unit are dissolved in a mixture of methylene chloride/methanol (85/15) to give a viscous spinning dope. The dope is dry-spun by conventional methods into a 108 denier, 24 filament yarn. The yarns are dyed to a level of 3% from a 50:1 bath at the boil, using the following basic dyes: Astrazone Pink FG, Astrazone Yellow 3G, and Astrazone Orange G (Venkataraman, K. "Synthetic Dyes," Academic Press, Inc., New York, page 1174), and the blue cationic dye, N,N'-tetraethyl-3,7-diaminophenoxazine. Prior to fastness evaluations, the dyed yarns are heatset at 430° F. for one minute. No sublimation of the dyestuff was observable during this operation. The dyeings passed five Launder-O-Meter wash tests (140° F., 0.5% soap, 30 minutes), and passed without appreciable change, 20 to 40 hours in the Fad-Ometer.

In a comparison of the physical properties of the three component composition of this example with a control described below, it was found that both samples had the same Fiber Stick Temperature (256° C.) and that the control had only a slightly higher Zero Strength Temperature about 292° C. as compared with about 281° C.

The control yarn was prepared by dissolving 91 grams of cellulose triacetate (2.74 acetyl groups per glucose unit) and 9 grams of SECA (0.22 sulfonic acid group per glucose unit) in methylene chloride/methanol (85/15). Such a composition contains the same average acetyl and sulfonic acid substitution as the optimum composition. However, when dry-spun into yarn, and treated as described in the foregoing, the individual filaments were only "ring-dyed," whereas dye penetration was complete in the case of the yarn spun from the optimum flake, as determined by cross-section photomicrographs (400×).

*Example II*

Sixty-nine grams of cellulose triacetate containing 2.92 acetyl groups per glucose unit, 22 grams of cellulose acetate containing 2.25 acetyl groups per glucose unit, and 9 grams of SECA containing 0.22 sulfonic acid group per glucose unit are dissolved in a mixture of methylene chloride/methanol, 85/15, to form a viscous spinning dope. This dope is dry-spun, and the resulting yarn is dyed and treated as in Example I. The dyeings passed ten to twenty Fad-Ometer hours, five Launder-O-Meter (140° F., 0.5% soap, 30 minutes) wash tests. The yarns from both Examples I and II give the characteristic X-ray diffraction pattern of heat-set cellulose triacetate.

The foregoing examples are presented to indicate practical operation of the invention, and are not intended to limit its disclosure. In addition to the use of sulfoethyl cellulose acetate as the sulfonated minor component, the compounds mentioned in U.S. application S.N. 512,567 (Hoffman and Wilkinson) can also be used, as taught therein. Additional basic dyestuffs which are suitable for this invention, in addition to those already mentioned, include those listed in the Hoffman and Wilkinson application.

The novel cellulose triacetate compositions are readily dyeable and particularly suitable in films, yarns, and fabrics, where high color brilliance, good fastness properties, and freedom from sublimation of the dyestuff in heat-setting and ironing is desired. Commercial dyeing can be made versatile using the articles of this invention, since disperse dyeability is retained. This property would permit many useful and attractive effects with cross dyeing and union dyeing, as well as fabric printing based on the non-staining property of basic dyes during washing. Many useful and attractive effects can be achieved by heat-setting the articles composed of the composition of this invention, such as pleats, folds, moires, and creases, and articles so treated can be rendered more functional and attractive due to their fast coloration.

Articles composed according to this invention retain basic dye colors much better than articles composed of unmodified cellulose derivatives dyed in the usual manner, or than modified cellulose derivatives dyed with direct or acid dyestuffs. Moreover, the physical and thermal properties of the yarns, films, and fabrics so produced are not deleteriously affected. Articles composed according to this invention have dye penetration and retention properties which are substantially improved over ordinary modified cellulose triacetate containing the same over-all degree of acetyl substitution. The unique distribution of acetyl groups in the articles, and the fast coloration of such articles by basic dyes affords a product of great versatility.

We claim:

1. A composition consisting essentially of at least 60% by weight of cellulose triacetate containing 2.7 to 3.0 acetyl groups per glucose unit and as minor components in amounts of from 5–25% each, a polymeric substance containing as part of the polymer structure sulfonic acid groups available for reaction with basic dyestuffs and a cellulose acetate containing from about 2.0–2.3 acetyl groups per glucose unit, there being at least about 10 milliequivalents of sulfonic acid groups present per kilogram of final composition.

2. A composition consisting essentially of at least 60% by weight of cellulose triacetate containing 2.7 to 3.0 acetyl groups per glucose unit and as minor components in amounts of from 5–25% each, a cellulosic material, bearing on the polymer chain acid groups selected from the class consisting of sulfonic acid and salts thereof hydrolyzable to the acid and a cellulose acetate containing from about 2.0–2.3 acetyl groups per glucose unit, there being present at least 10 milliequivalents of acid groups per kilogram of final composition.

3. The composition of claim 2 wherein the sulfonated component is sulfoethyl cellulose acetate.

4. A spinning solution consisting essentially of the composition of claim 2 dissolved in an organic solvent.

5. A filament of the composition of claim 1.

6. The composition of claim 1 wherein the polymeric substance containing the sulfonic acid groups is selected from the group consisting of sulfonated cellulose ethers and esters.

References Cited in the file of this patent
UNITED STATES PATENTS

| | | |
|---|---|---|
| 2,849,330 | Hoffman et al. | Aug. 26, 1958 |
| 2,880,106 | Hawtin et al. | Mar. 31, 1959 |

OTHER REFERENCES

Boulton: "Courpleta—The Dyeing and Other Properties of Cellulose Triacetate Yarn and Staple," Journal of the Society of Dyers and Colorists, vol. 71, No. 8, August 1955, pp. 451–464.

Mellor et al.: "The Dyeing and Finishing of Cellulose Triacetate Yarns and Fabrics," Journal of Soc. of Dyers and Colorists, vol. 71, No. 13, December 1955, pp. 817–829.